United States Patent [19]

Uchiyama et al.

[11] Patent Number: 4,751,157

[45] Date of Patent: Jun. 14, 1988

[54] CATHODE MATERIAL FOR USE IN LITHIUM ELECTROCHEMICAL CELL AND LITHIUM ELECTROCHEMICAL CELL INCLUDING SAID CATHODE MATERIAL

[75] Inventors: Michelle C. Uchiyama, Somerset; Steven M. Slane, Neptune; Mark Salomon, Sea Bright, all of N.J.

[73] Assignee: The United States of America as represented by the Secretary of the Army, Washington, D.C.

[21] Appl. No.: 59,346

[22] Filed: Jun. 8, 1987

[51] Int. Cl.$^4$ .......................... H01M 4/02; H01M 6/16
[52] U.S. Cl. .................................... 429/194; 429/218; 252/182.1
[58] Field of Search ............... 429/218, 194, 232, 217; 252/518, 500, 182.1; 423/593, 606

[56] References Cited

U.S. PATENT DOCUMENTS

| | | | |
|---|---|---|---|
| 4,119,771 | 10/1978 | Saridakis | 429/218 X |
| 4,233,375 | 11/1980 | Whittingham et al. | 429/218 X |
| 4,310,609 | 1/1982 | Liang et al. | 429/218 X |
| 4,675,260 | 6/1987 | Sakurai et al. | 429/218 X |

*Primary Examiner*—Anthony Skapars
*Attorney, Agent, or Firm*—Sheldon Kanars; Roy E. Gordon

[57] ABSTRACT

A cathode is provided for use in a lithium electrochemical cell wherein the cathode includes a mix of a mixed metal-oxide prepared from $V_2O_5$ and $MoO_3$, conductive diluent, and aqueous based binder and wherein the mix is rolled onto a nickel screen and sintered under vacuum at about 280° C.

10 Claims, No Drawings

CATHODE MATERIAL FOR USE IN LITHIUM ELECTROCHEMICAL CELL AND LITHIUM ELECTROCHEMICAL CELL INCLUDING SAID CATHODE MATERIAL

The invention described herein may be manufactured, used, and licensed by or for the Government for governmental purposes without the payment to us of any royalty thereon.

This invention relates in general to a cathode material for use in a lithium electrochemical cell and to a lithium electrochemical cell including the cathode material, and in particular, to the use of a mixed metal oxide prepared from $V_2O_5$ and $MoO_3$ as the cathode active material for use in a lithium electrochemical cell and to a lithium electrochemical cell including a mixed metal oxide prepared from $V_2O_5$ and $MoO_3$ as the cathode active material.

BACKGROUND OF THE INVENTION

The demand for improved energy storage devices has increased steadily with the advent of new techniques utilizing batteries as power sources. A particularly large application is batteries for man-portable electronic equipment, where expense, reliability, lightweight, durability and high energy density are critical features. For applications with large loads, rechargeable batteries are often used and lithium systems offer the potential for both high energy and light weight. An important objective in developing a practical rechargeable lithium battery for this application is to provide an inexpensive, high energy material with excellent cycle-life and rate capabilities for use as the cathode.

The class of lithium intercalating transition metal oxides are particularly attractive for this purpose because of their tendency to possess high energy content. However, the known oxides are either expensive to prepare as is the case with the vanadium oxides or they are electronic insulators thereby preventing their use for high battery current applications. Another difficulty with transition metal oxides, especially $V_2O_5$ is susceptibility to over-discharge which results in structural rearrangement and severe losses in cell capacity.

SUMMARY OF THE INVENTION

The general object of this invention is to provide an improved lithium electrochemical cell. A more particular object of the invention is to provide an inexpensive, high energy material with excellent cycle-life and rate capabilities for use as the cathode of the lithium electrochemical cell.

It has now been found that the aforementioned objects can be attained by providing a new mixed-metal oxide of vanadium and molybdenum with the formulation $V_9Mo_6O_{40}$ and solid solutions of $V_9Mo_6O_{40}$ with $V_2O_5$ or $MoO_3$ for use as the cathode active material in a lithium electrochemical cell. Use of these materials in cathodes for lithium electrochemical cells results in an inexpensive, high energy, high rate cathode with good cycle life.

The cathode active materials are prepared by a combination of stoichiometric quantities of $V_2O_5$ and $MoO_3$, high temperature firing in evacuated quartz tubes, followed by rapid quenching to assure small particle size. The materials so obtained are then fabricated into cathodes utilizing an aqueous Teflon emulsion. A nickel screen is used as the current collector. The cathodes are highly flexible and not sensitive to exposure to air.

The cathodes made from $V_9Mo_6O_{40}$ and solid solutions of $V_9Mo_6O_{40}$ with $V_2O_5$ or $MoO_3$ also display minimal losses in capacity upon extended cycling and can be reversibly cycled to lower potentials than the parent oxide $V_2O_5$. Thus, these materials have a greater resistance to over-discharge than $V_2O_5$. An additional advantage of these new cathodes is that they can reversibly handle higher current densities on extended cycling than the parent oxide $V_2O_5$. Finally, several advantages are observed in the cost and preparation of these materials as cathodes. With regard to preparation of the oxides, reagent grade materials are used in the synthesis, and the overall stoichiometry need not be very strictly controlled since solid solutions of $V_9Mo_6O_{40}$ with $V_2O_5$ or $MoO_3$ display acceptable behavior. With regard to cathode fabrication, a procedure utilizing aqueous teflon emulsions in a normal air atmosphere may be used yielding highly flexible cathodes. This results in significant advantages over materials such as $V_2O_5$ which is water soluble and $TiS_2$ which is both air and water sensitive, thus excluding the use of aqueous teflon suspension in cathode fabrication. In addition, cathodes prepared by this procedure are flexible enough to be rolled and can therefore be utilized in a spirally wound configuration.

DESCRIPTION OF THE PREFERRED EMBODIMENT

A cathode mix of 70 weight percent active material such as $V_9Mo_6O_{40}$ or solid solutions of $V_9Mo_6O_{40}$ with $V_2O_5$ or $MoO_3$, 20 weight percent conductive diluent such as Shawinigan Acetylene Black, and 10 weight percent binder such as Teflon is prepared using an aqueous Teflon emulsion. The weight percent of conductive diluent may range from 0 to 30 percent and the weight of binder may range from 1 to 30 percent. Other conductive diluents such as high surface area carbons, graphites or other conductive materials may be used. In addition, other binders such as polyolefins or elastomers may be substituted for Teflon. The weight percent of active materials may range from 44 to 99 percent. When any component of the cathode mix is changed, the concentrations of the remaining components are adjusted accordingly. The cathode mix is rolled onto an Exmet Nickel screen, sintered under vacuum at 280° C.

Experimental laboratory test cells include a wick cell configuration utilizing flag electrodes in a pressure reaction vessel. A lithium anode on each side of the cathode is separated by a porous fiber separator (wick). The electrodes are sealed in polypropylene separator material. Laboratory test cells are equiped with a lithium reference electrode which is unnecessary in practical configuration.

Cathodes prepared as described in the preferred embodiment are used in cathode limited cells with 2.0M $LiAsF_6$ in methyl formate as the electrolyte. Other stable electrolyte systems may be substituted for $LiAsF_6$ in the aprotic solvent methyl formate. These cells exhibit high experimental energy densities (based on active material), ranging from 810 Wh/kg (first cycle) to 250 Wh/kg on the twentieth cycle. Cells utilizing $V_9Mo_6O_{40}$ based cathodes exhibit highest energy densities and excellent capacity retention at 1.0 mA/cm². Approximately 20 percent capacity loss is observed after 25 cycles at higher current densities of 2.0 and 5.0 mA/cm². Cells utilizing cathodes prepared from solid solutions of $V_6Mo_9O_{40}$ and $V_2O_5$ exhibit higher capacities on initial cycles (up to fifteen cycles) but show poorer capacity retention on cycling when compared with cathodes prepared from $V_9Mo_6O_{40}$. Cells utilizing cathodes prepared from solid solutions of $V_9Mo_6O_{40}$ with $MoO_3$ display similar capacities to cells utilizing cathodes prepared from $V_9Mo_6O_{40}$ in initial cycles but poorer capacity retention on the ninth and subsequent cycles.

The electrochemical cells of this invention can be used as either a rechargeable system or a primary system.

We wish it to be understood that we do not desire to be limited to the exact details of construction shown and described for obvious modifications will occur to a person skilled in the art.

What is claimed is:

1. A cathode for use in a lithium electrochemical cell, said cathode comprising a mix of about 40 to 99 weight percent of a mixed metal oxide prepared from $V_2O_5$ and $MoO_3$, wherein the mixed metal oxide prepared from $V_2O_5$ and $MoO_3$ is selected from the group consisting of $V_9Mo_6O_{40}$, a solid solution of $V_9Mo_6O_{40}$ with $V_2O_5$, and a solid solution of $V_9Mo_6O_{40}$ with $MoO_3$, about 0 to 30 weight percent of a conductive diluent and about 1 to 30 weight percent of an aqueous based binder, wherein said mix is rolled onto a nickel screen and sintered under vacuum at about 280° C.

2. A cathode according to claim 1 wherein mixed metal oxide prepared from $V_2O_5$ and $MoO_3$ is $V_9Mo_6O_{40}$.

3. A cathode according to claim 1 wherein the mixed metal oxide prepared from $V_2O_5$ and $MoO_3$ is a solid solution of $V_9Mo_6O_{40}$ with $V_2O_5$.

4. A cathode according to claim 1 wherein the mixed metal oxide prepared from $V_2O_5$ and $MoO_3$ is a solid solution of $V_9Mo_6O_{40}$ with $MoO_3$.

5. A cathode for use in a lithium electrochemical cell, said cathode comprising a mix of about 70 weight percent $V_9Mo_6O_{40}$, about 20 weight percent Shawinigan Acetylene Black, and about 10 weight percent aqueous Teflon emulsion, wherein said mix is rolled onto a nickel screen and sintered under vacuum at about 280° C.

6. A lithium electrochemical cell comprising lithium as the anode, a cathode mix of about 40 to 99 weight percent of a mixed metal oxide prepared from $V_2O_5$ and $MoO_3$, wherein the mixed metal oxide prepared from $V_2O_5$ and $MoO_3$ is selected from the group consisting of $V_9Mo_6O_{40}$, a solid solution of $V_9Mo_6O_{40}$ with $V_2O_5$ and a solid solution of $V_9Mo_6O_{40}$ with $MoO_3$, about 0 to 30 weight percent of conductive diluent and about 1 to 30 weight percent of an aqueous based binder wherein said mix is rolled onto a nickel screen and sintered under vacuum at about 280° C. as the cathode, and an inorganic lithium salt dissolved in an aprotic solvent as the electrolyte.

7. A lithium electrochemical cell according to claim 6 wherein the mixed metal oxide prepared from $V_2O_5$ and $MoO_3$ is $V_9Mo_6O_{40}$.

8. A lithium electrochemical cell according to claim 6 wherein the mixed metal oxide prepared from $V_2O_5$ and $MoO_3$ is a solid solution of $V_9Mo_6O_{40}$ with $V_2O_5$.

9. A lithium electrochemical cell according to claim 6 wherein the mixed metal oxide prepared from $V_2O_5$ and $MoO_3$ is a solid solution of $V_9Mo_6O_{40}$ with $MoO_3$.

10. A lithium electrochemical cell comprising lithium as the anode, a cathode mix of about 70 weight percent $V_9Mo_6O_{40}$, about 20 weight percent Shawinigan Acetylene Black, and about 10 weight percent aqueous Teflon emulsion wherein said mix is rolled onto a nickel screen and sintered under vacuum at about 280° C. as the cathode, and a solution of 2 molar $LiAsF$ in methyl formate as the electrolyte.

* * * * *